US007822230B2

(12) United States Patent
Fujimaki et al.

(10) Patent No.: US 7,822,230 B2
(45) Date of Patent: Oct. 26, 2010

(54) IMAGE MEASURING SYSTEM, IMAGE METHOD AND COMPUTER READABLE MEDIUM STORING IMAGE MEASURING PROGRAM HAVING A NONSTOP MEASURING MODE FOR SETTING A MEASUREMENT PATH

(75) Inventors: Shigeru Fujimaki, Tokyo (JP); Koichi Komatsu, Yamato (JP)

(73) Assignee: Mitutoyo Corporation, Kawasaki-shi (JP)

( * ) Notice: Subject to any disclaimer, the term of this patent is extended or adjusted under 35 U.S.C. 154(b) by 913 days.

(21) Appl. No.: 11/710,563

(22) Filed: Feb. 26, 2007

(65) Prior Publication Data
US 2007/0201041 A1   Aug. 30, 2007

(30) Foreign Application Priority Data
Feb. 28, 2006   (JP)   ............................... 2006-051774

(51) Int. Cl.
G06K 9/00   (2006.01)
G06T 11/20   (2006.01)
(52) U.S. Cl. ........................................ 382/106; 345/442
(58) Field of Classification Search .................. 382/106
See application file for complete search history.

(56) References Cited
U.S. PATENT DOCUMENTS

| 4,623,977 | A | * | 11/1986 | Schrieber ..................... 702/189 |
| 4,688,182 | A | * | 8/1987 | Schrieber ..................... 345/442 |
| 5,412,770 | A | * | 5/1995 | Yamashita et al. ........... 345/442 |
| 5,500,927 | A | * | 3/1996 | Sander-Cederlof et al. .. 345/442 |
| 5,594,852 | A | * | 1/1997 | Tankelevich ................. 345/441 |
| 5,636,338 | A | * | 6/1997 | Moreton ...................... 345/442 |
| 5,726,896 | A | * | 3/1998 | Jia et al. ..................... 700/187 |
| 5,726,917 | A |   | 3/1998 | Staaden |
| 5,754,183 | A | * | 5/1998 | Berend et al. ................ 345/592 |
| 6,256,039 | B1 | * | 7/2001 | Krishnamurthy ............ 345/420 |
| 6,304,677 | B1 | * | 10/2001 | Schuster ..................... 382/264 |
| 6,373,491 | B1 | * | 4/2002 | Sasaki ........................ 345/443 |
| 6,441,823 | B1 | * | 8/2002 | Ananya ....................... 345/442 |
| 6,512,847 | B1 | * | 1/2003 | Gnutzmann ................. 382/173 |
| 6,757,613 | B2 | * | 6/2004 | Chapman et al. .............. 702/6 |
| 7,116,327 | B2 | * | 10/2006 | Katka ......................... 345/442 |
| 2004/0109205 | A1 | * | 6/2004 | Asano et al. ................ 358/448 |

(Continued)

FOREIGN PATENT DOCUMENTS

DE   195 29 547 A1   2/1997

(Continued)

Primary Examiner—Bhavesh Mehta
Assistant Examiner—David P Rashid
(74) Attorney, Agent, or Firm—Oliff & Berridge, PLC

(57) ABSTRACT

An image measuring system comprises a measurement point acquire, a measurement direction calculator, a synthesized direction calculator operative to calculate a synthesized direction resulted from synthesis of movement directions before and after the measurement point, a fore/aft-running point calculator operative to calculate a forerunning point at a position spaced a certain distance backward in the synthesized direction from the measurement point and to calculate an aft-running point at a position spaced a certain distance forward in the synthesized direction from the measurement point, a way point calculator operative to calculate a plurality of way points arranged on a path smoothly connecting the aft-running point to the forerunning point, and a measurement path setter operative to set a measurement path following the synthesized directions and passing through the calculated way points and the measurement points.

12 Claims, 8 Drawing Sheets

U.S. PATENT DOCUMENTS

2004/0156054 A1  8/2004  Christoph

FOREIGN PATENT DOCUMENTS

| EP | 1 102 139 A2 | 5/2001 |
| JP | A 2004-535587 | 11/2004 |
| WO | WO 91/20020 A1 | 12/1991 |
| WO | WO 03/009070 A2 | 1/2003 |

* cited by examiner

IMAGE MEASURING SYSTEM, IMAGE METHOD AND COMPUTER READABLE MEDIUM STORING IMAGE MEASURING PROGRAM HAVING A NONSTOP MEASURING MODE FOR SETTING A MEASUREMENT PATH

CROSS REFERENCE TO RELATED APPLICATION

This application is based on and claims the benefit of priority from the prior Japanese Patent Application No. 2006-51774, filed on Feb. 28, 2006, the entire contents of which are incorporated herein by reference.

BACKGROUND OF THE INVENTION

1. Field of the Invention

The present invention relates to an image measuring system, image measuring method and image measuring program provided with a nonstop measurement mode for moving an imaging means relative to a measurement stage that supports an object to be measured and taking in instantaneous image information without making a stop at a designated measurement location.

2. Description of the Related Art

A conventional CNC image measuring machine moves a measurement stage relative to an imaging means such as a CCD camera, as shown in FIG. 13, and makes a stop at a measurement location. Then, it adjusts the amount of illuminative light to acquire image information about an object to be measured, and applies image processing such as measuring tool setting and edge detection to the acquired image information, thereby executing a measurement at one measurement location. This measurement is repeatedly executed as Measurement 1, Measurement 2, . . . at all measurement locations to complete measurements at required locations (hereinafter such the measurement mode is referred to as a "standard mode").

In contrast, for the purpose of improving the measurement throughput, an image measuring machine is proposed, which has a measurement mode for measuring without making no stop of the measurement stage relative to the imaging means even at the measurement location (hereinafter such the measurement mode is referred to as a "nonstop measurement mode") (JP 2004-535587A, paragraphs 0005-0006, FIG. 2). This image measuring machine irradiates the object with strobe illumination or uses a shuttered CCD camera to capture instantaneous image information without making no stop of the measurement stage at measurement locations as shown in FIG. 14. Then, it takes in the captured instantaneous image information for image measuring. This image measuring machine positions the CCD camera fast and roughly in the measurement region and, after deceleration, it takes in an image in a slow region.

The above-described conventional image measuring machine has no problem if the measurement locations are arranged along a straight line. To the contrary, if they are not arranged along a straight line, when the speed of the measuring machine is kept constant to execute measurements at measurement locations, a problem may arise. Namely, a larger variation angle of the advancing direction, with a measurement pulse such as a square (a directional variation angle of 90°) or a Z-shape (a directional variation angle of 90° or more), requires an addition of a larger acceleration to follow a turning location (hereinafter referred to as a bent point) and accordingly overloads the machine. This results in vibrations of the machine and causes shakes of subsequent captured images (deterioration of the image quality) and shakes of imaging positions, which deteriorate measurement accuracy of the image. In some cases, the overload may blow a protective fuse.

The present invention has been made in consideration of such the problem and has an object to provide an image measuring system, image measuring method and image measuring program capable of preventing deterioration of measurement accuracy and of imposing no overload on any movement mechanism.

SUMMARY OF THE INVENTION

The present invention provides an image measuring system for moving an imaging means relative to a measurement stage that supports an object to be measured and taking in instantaneous image information about the object without making a stop of the imaging means at any of a plurality of measurement locations, thereby performing image measuring. The system comprises a measurement point acquirer operative to acquire measurement points; a movement direction calculator operative to acquire a shortest path connecting between the measurement points and to calculate a movement direction on the shortest path; a synthesized direction calculator operative to calculate a synthesized direction resulted from synthesis of movement directions before and after the measurement point; a fore/aft-running point calculator operative to calculate a forerunning point at a position spaced a certain distance backward in the synthesized direction from the measurement point from which the synthesized direction is calculated and to calculate an aft-running point at a position spaced a certain distance forward in the synthesized direction from the measurement point from which the synthesized direction is calculated; a way point calculator operative to calculate a plurality of way points arranged on a path smoothly connecting the aft-running point to the forerunning point related to a measurement point located one point posterior in a measurement sequence to the measurement point from which the aft-running point is calculated, such that the path follows the synthesized direction at both points; and a measurement path setter operative to set a measurement path following the synthesized directions and passing through the calculated way points and the measurement points.

The present invention also provides an image measuring method for moving an imaging means relative to a measurement stage that supports an object to be measured and taking in instantaneous image information about the object without making a stop of the imaging means at any of a plurality of measurement locations, thereby performing image measuring. The method comprises a measurement point acquisition step of acquiring measurement points; a movement direction calculation step of acquiring a shortest path connecting between the measurement points and calculating a movement direction on the shortest path; a synthesized direction calculation step of calculating a synthesized direction resulted from synthesis of movement directions before and after the measurement point; a fore/aft-running point calculation step of calculating a forerunning point at a position spaced a certain distance backward in the synthesized direction from the measurement point from which the synthesized direction is calculated and calculating an aft-running point at a position spaced a certain distance forward in the synthesized direction from the measurement point from which the synthesized direction is calculated; a way point calculation step of calculating a plurality of way points arranged on a path smoothly connecting the aft-running point to the forerunning point related to a measurement point located one point posterior in a measurement sequence to the measurement point from which the aft-running point is calculated, such that the path follows the synthesized direction at both points; and a measurement path setting step of setting a measurement path following the synthesized directions and passing through the calculated way points and the measurement points.

The present invention further provides a computer executable, image measuring program for moving an imaging means relative to a measurement stage that supports an object to be measured and taking in instantaneous image information about the object without making a stop of the imaging means at any of a plurality of measurement locations, thereby performing image measuring. The program comprises a measurement point acquisition step of acquiring measurement points; a movement direction calculation step of acquiring a shortest path connecting between the measurement points and calculating a movement direction on the shortest path; a synthesized direction calculation step of calculating a synthesized direction resulted from synthesis of movement directions before and after the measurement point; a fore/aft-running point calculation step of calculating a forerunning point at a position spaced a certain distance backward in the synthesized direction from the measurement point from which the synthesized direction is calculated and calculating an aft-running point at a position spaced a certain distance forward in the synthesized direction from the measurement point from which the synthesized direction is calculated; a way point calculation step of calculating a plurality of way points arranged on a path smoothly connecting the aft-running point to the forerunning point related to a measurement point located one point posterior in a measurement sequence to the measurement point from which the aft-running point is calculated, such that the path follows the synthesized direction at both points; and a measurement path setting step of setting a measurement path following the synthesized directions and passing through the calculated way points and the measurement points.

DETAILED DESCRIPTION OF THE EMBODIMENTS

The embodiment of the present invention will now be described below with reference to the drawings.

[System Configuration]

Figure 1:
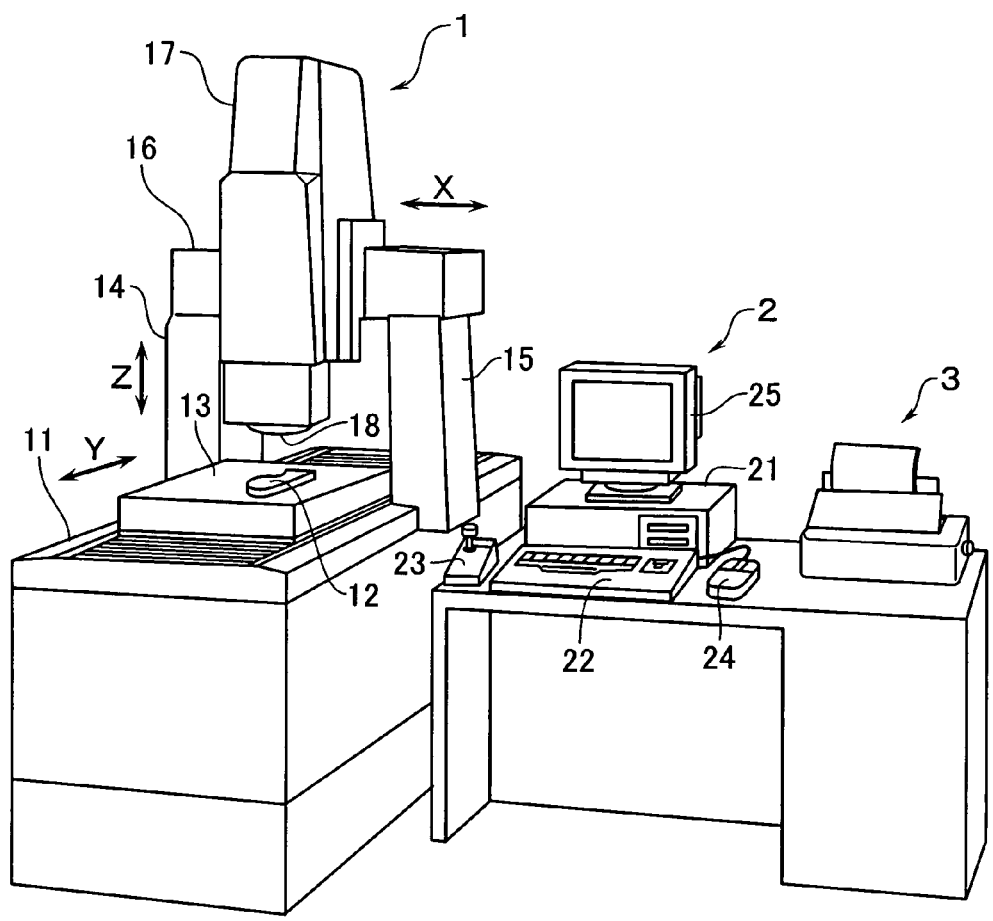
FIG. 1 is an external perspective view illustrative of a configuration of an image measuring system according to an embodiment of the invention.

FIG. 1 is a perspective view illustrative of the entire configuration of an image measuring system according to an embodiment of the invention. The system comprises an image measuring machine 1 of the non-contact type, a computer system 2 operative to drive control the image measuring machine 1 and execute required data processing, and a printer 3 operative to print out measurement results.

The image measuring machine 1 includes a holder 11 on which a measurement stage 13 is equipped to receive a work 12 mounted thereon. The measurement stage 13 is driven in the Y-axis direction by a Y-axis drive mechanism, not shown. At the central portion between both side edges of the holder 11 are fixed support arms 14, 15 extending upward. An X-axis guide 16 is fixed to link both upper ends of the support arms 14, 15. The X-axis guide 16 supports an imaging unit 17 thereon. The imaging unit 17 is driven along the X-axis guide 16 by an X-axis drive mechanism, not shown. The imaging unit 17 has a lower end portion equipped with a CCD camera 18 as opposing the measurement stage 13. The imaging unit 17 contains an illuminator and a focusing mechanism as well as a Z-axis drive mechanism, not shown, operative to move the position of the CCD camera 18 in the Z-axis.

Figure 2:
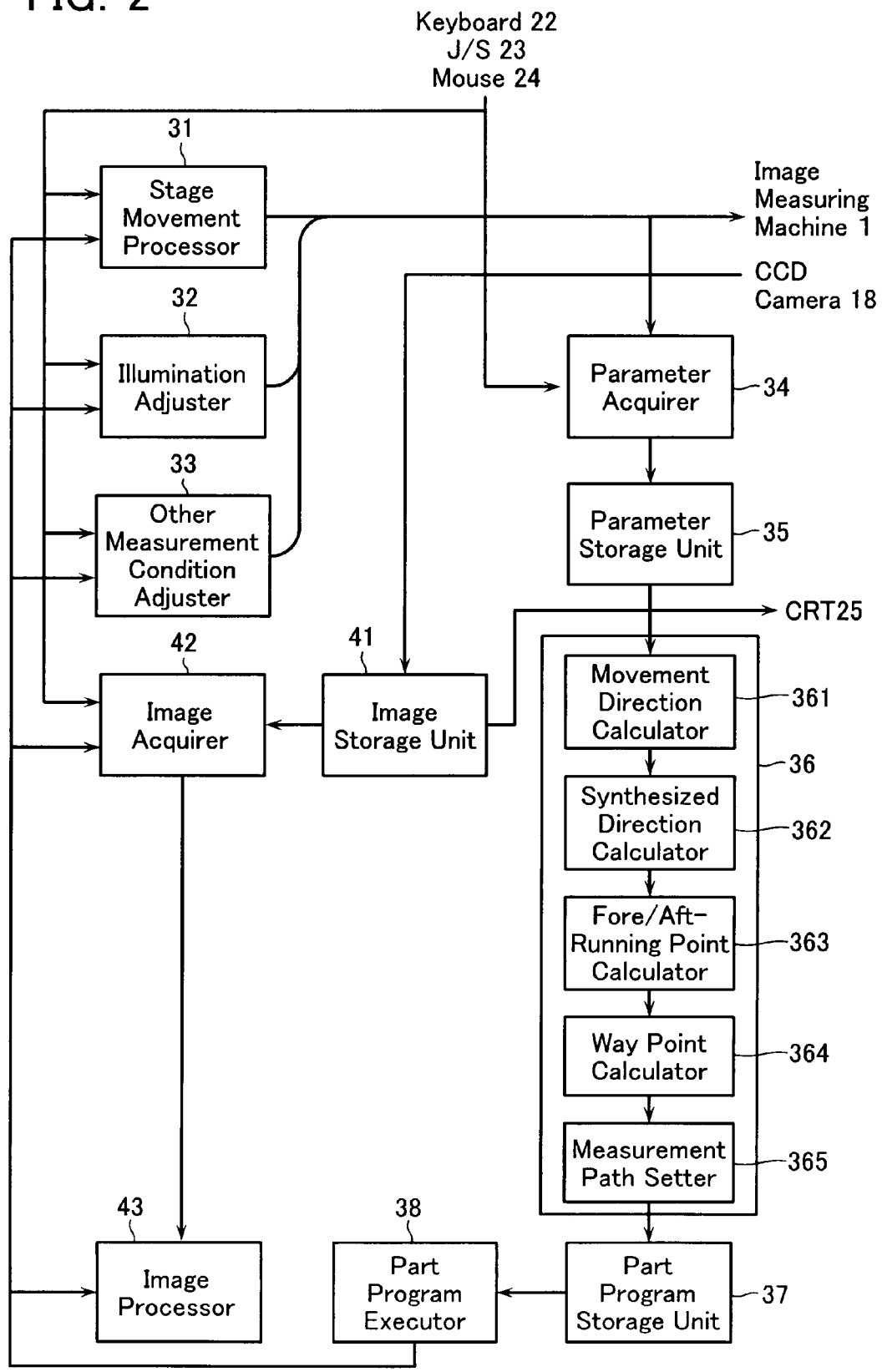
FIG. 2 is a functional block diagram of a computer in the measuring system.

The computer system 2 comprises a computer body 21, a keyboard 22, a joystick box (hereinafter referred to as J/S) 23, a mouse 24 and a CRT 25. The computer body 21 may realize functions shown in FIG. 2 together with certain programs stored inside.

It includes a stage movement processor 31 operative to control the image measuring machine 1 based on instruction inputs from input means such as the keyboard 22, the J/S 23 and the mouse 24; an illumination adjuster 32; and an other measurement condition adjuster 33. Based on a stage movement instruction input from the input means, the stage movement processor 31 controls an XYZ axes drive mechanism for the image measuring machine 1 to move the position of the CCD camera 18 relative to the measurement stage 13. The illumination adjuster 32, on teaching, drives the illuminator for the image measuring machine 1 to emit strobe light continuously at a certain period and adjusts the pulse width of the strobe light based on an illumination adjusting instruction input. In a nonstop measurement mode, it drives the illuminator to emit strobe light with a preset pulse width at designated measurement locations. Based on other measurement condition adjusting instruction inputs, the other measurement condition adjuster 33 adjusts other measurement conditions such as lens power and focusing adjustment.

The stage position, the pulse width of strobe light and the other measurement condition information adjusted at the processors 31-33 are taken in by a parameter acquire 34 based on certain instruction inputs from the input means. The parameter taken in by the parameter acquire 34 is stored in a parameter storage unit 35. A part program generator 36 generates a part program for measurement using the parameter stored in the parameter storage unit 35. The generated part program is stored in a part program storage unit 37.

The part program generator 36 mainly includes a movement direction calculator 361, a synthesized direction calculator 362, a fore/aft-running point calculator 363, a way point calculator 364, and a measurement path setter 365.

The movement direction calculator 361 is configured to acquire measurement points from the parameters taken from the parameter storage unit 35 to calculate a shortest measurement path that minimizes the distance between two of the measurement points, and a movement direction on the shortest measurement path.

The synthesized direction calculator 362 is configured to calculate a synthesized direction resulted from synthesis of the movement direction to a certain measurement point from a measurement point located one point anterior and the movement direction from the certain measurement point to a measurement point located one point posterior. The synthesis of the two movement directions before and after the measurement point may be other than 1:1 and appropriately modifiable.

The fore/aft-running point calculator 363 calculates a forerunning point at a position spaced a certain distance backward in the synthesized direction from the measurement point and an aft-running point at a position spaced a certain distance forward in the synthesized direction from the measurement point from which the synthesized direction is calculated. The distance from the forerunning point to the measurement point is made longer than the distance from measurement point to the aft-running point.

The way point calculator 364 is configured to calculate way points arranged along a line containing almost arcs smoothly coupling both the aft-running point related to the above-described measurement point and the forerunning point related to a measurement point located one point posterior in a measurement sequence to the measurement point. The distance between adjacent way points is calculated shorter than the distance from the forerunning point to the measurement point.

The measurement path setter 365 sets a measurement path along lines connecting the above-described measurement points, forerunning points, aft-running points and way points along synthesized vectors.

A part program executor 38 reads a required part program out of the part program storage unit 37 and executes it. The part program executor appropriately drives the stage movement processor 31, the illumination adjuster 32, the other measurement condition adjuster 33 and an image acquirer 43 in accordance with various commands described in the part program. The image information captured by the CCD camera 18 is sequentially stored in an image storage unit 41. The image information stored in the image storage unit 41 is sequentially displayed on a display unit 25 and captured as still images at the image acquirer 42 based on the part program. An image processor 43 executes image processing for image measurement, such as measuring tool setting, edge detection, and coordinate detection to the image information acquired at the image acquirer 42.

[Procedure of Setting Measurement Path]

Figure 3:
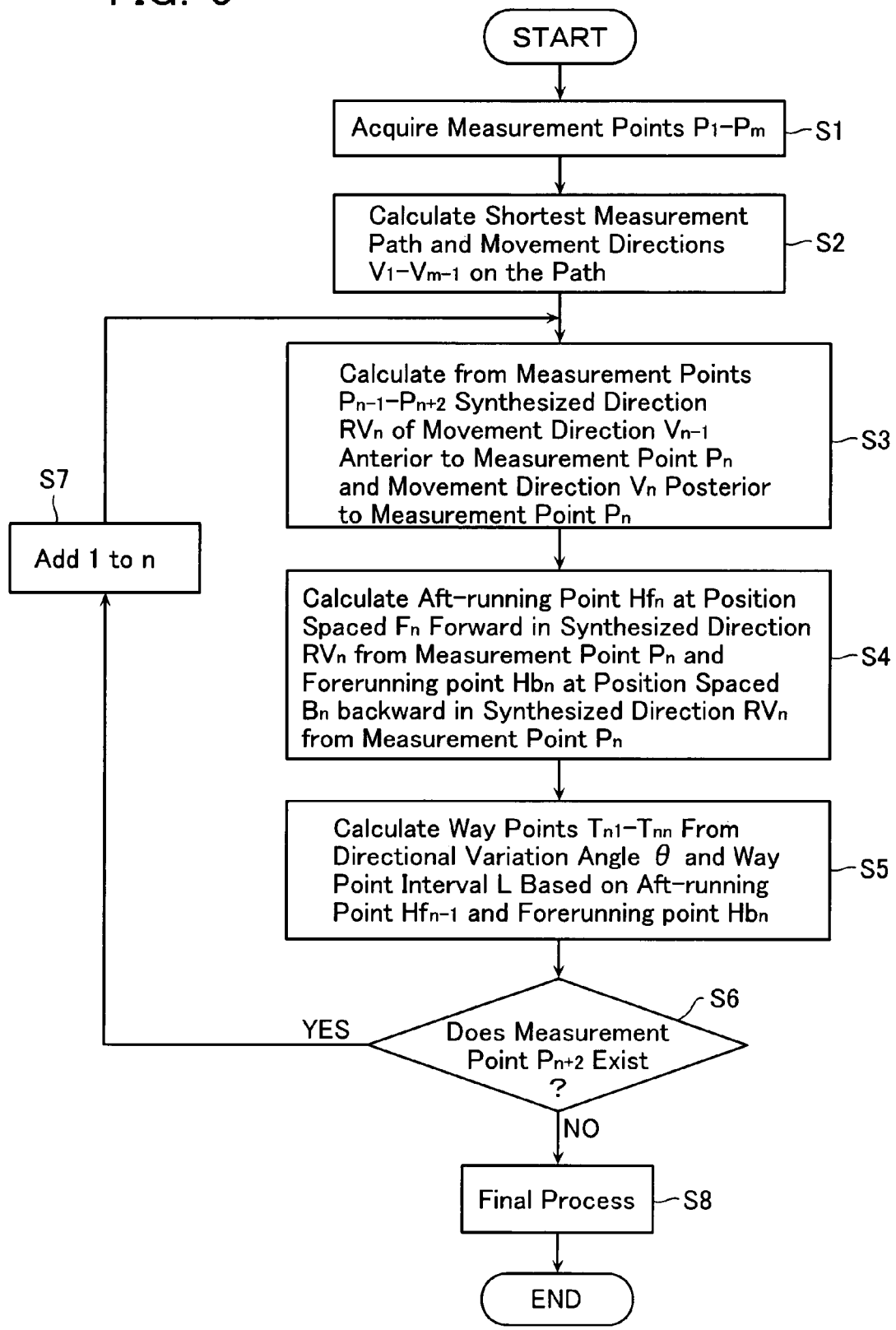
FIG. 3 is a flowchart illustrative of a procedure of setting measurement paths in the measuring system.
Figure 4:
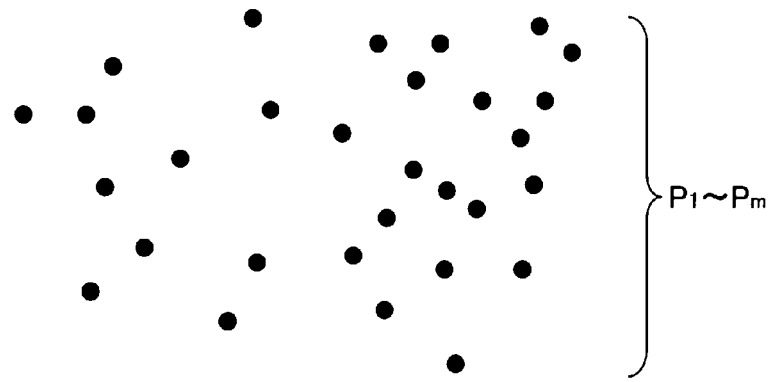
FIG. 4 shows part of the measurement in the system.
Figure 5:
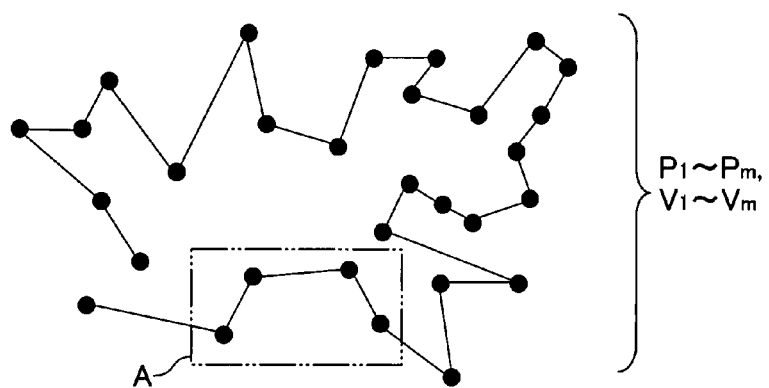
FIG. 5 shows part of the measurement in the system.
Figure 6:
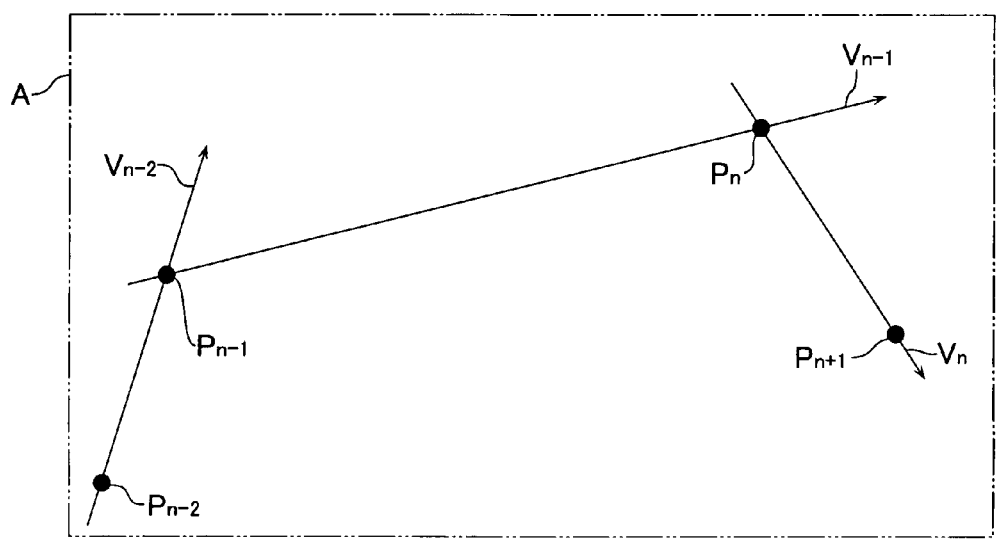
FIG. 6 shows part of the measurement in the system.

With reference to a flowchart of FIG. 3 and appropriately to FIGS. 4-9, a procedure of setting measurement paths in the image measuring system thus configured according to the embodiment is described. The measurement path setting may be processed during generation of the part program in offline teaching. FIGS. 4-9 are schematic views representative of a method of determining measurement points. In particular, FIGS. 6-9 are schematic views representative of a method of determining a measurement path from a measurement point $P_n$ to a measurement point $P_{n+1}$. FIG. 6 is an enlarged view of a portion A in FIG. 5.

First, as shown in FIG. 4, the parameter acquirer 34 acquires parameters to determine measurement points $P_1$-$P_m$ (step S1). The parameters include information that can specify the measurement points. In addition to the measurement points, they may include information about measurement routes at measurement locations.

Next, as shown in FIGS. 5 and 6, the movement direction calculator 361 calculates a shortest measurement path that minimizes the sum of distances between two of measurement points $P_1$-$P_m$, and movement directions $V_1$-$V_{m-1}$ on the measurement paths (step S2).

Figure 7:
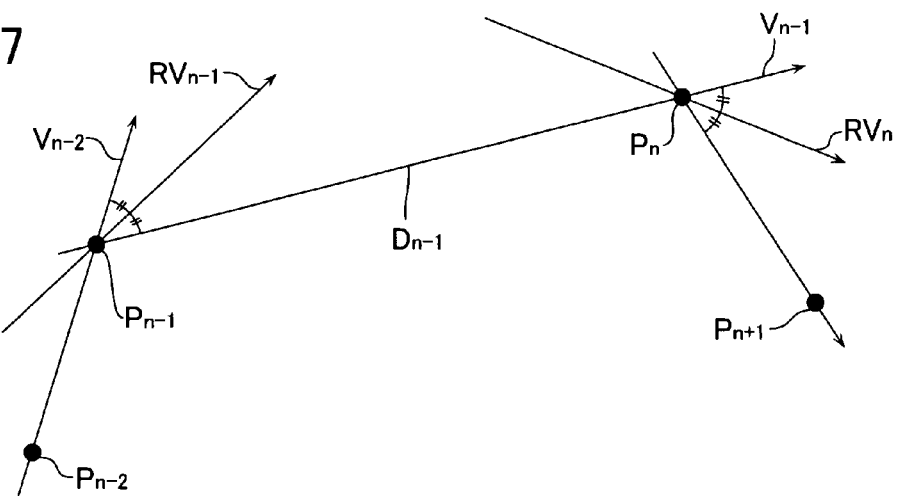
FIG. 7 shows part of the measurement in the system.

Subsequently, as shown in FIG. 7, the synthesized direction calculator 362 calculates a synthesized direction $RV_n$ based on a movement direction $V_{n-1}$ to a measurement point $P_n$ from a measurement point $P_{n-1}$ located one point anterior on the measurement path and a movement direction from the measurement point $P_n$ to the next measurement point $P_{n+1}$ (step S3). The example of measurement shown in FIG. 7 shows the case where the synthesized direction $RV_{n-1}$, the movement direction $V_{n-1}$ and the synthesized direction $RV_n$ are determined in this order, and the directional variations occur in the same direction. In this case, there is a sufficient interval $D_{n-1}$ between the measurement point $P_n$ and the measurement point $P_{n-1}$. In FIG. 7, two movement directions are synthesized at a proportion of 1:1, which though may be modifiable based on the measurement speed and the angle between measurement points.

Figure 8:
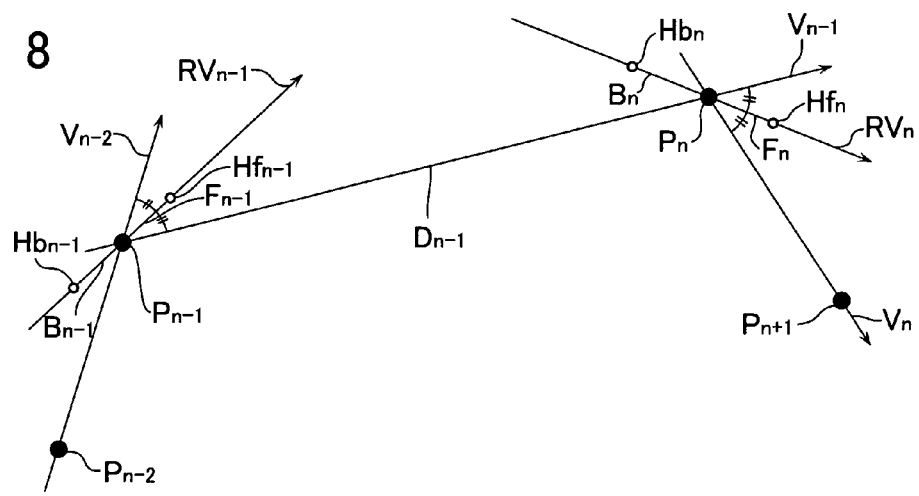
FIG. 8 shows part of the measurement in the system.
Figure 9:
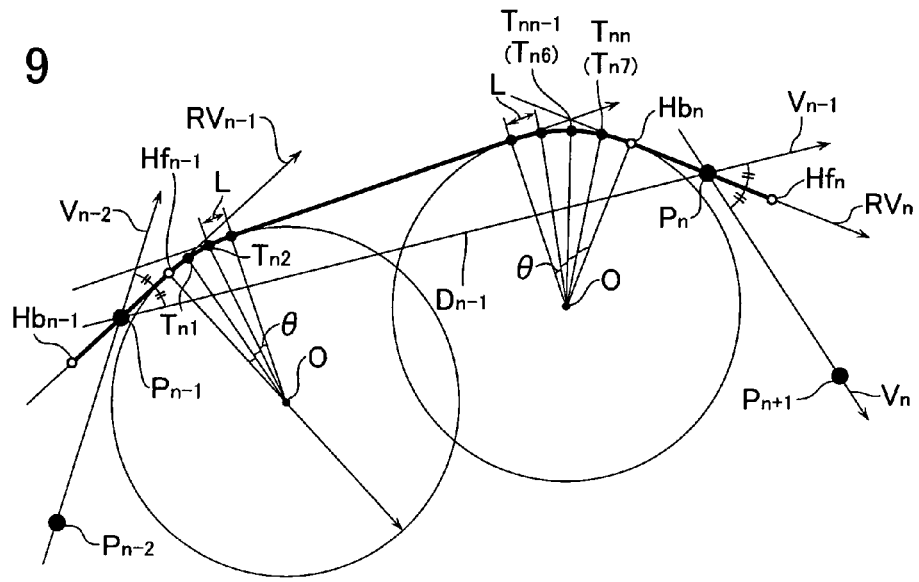
FIG. 9 shows part of the measurement in the system.

In FIGS. 7-9, for simplification of the description, only the synthesized directions $RV_n$, $RV_{n-1}$ are described. Such the synthesized directions are calculated over all measurement points $P_2$-$P_{m-1}$ except for measurement points at a measurement starting point (first) and a measurement terminating point (m-th). As for the measurement point $P_1$ from which the measurement starts, the movement direction $V_1$ may be regarded as a synthesized direction $RV_1$. As for the measurement point $P_m$ at which the measurement terminates, the movement direction $V_{m-1}$ may be regarded as a synthesized direction $RV_m$.

Next, as shown in FIG. 8, the fore/aft-running point calculator 363 calculates an aft-running point $Hf_n$ at a position spaced a certain distance $F_n$ forward in the synthesized direction $RV_n$ from the measurement point $P_n$ and a forerunning point $Hb_n$ at a position spaced a certain distance $B_n$ backward in the synthesized direction $RV_n$ from the measurement point $P_n$ (step S4).

Subsequently, as shown in FIG. 9, the way point calculator 364 determines way points $T_{n1}$-$T_{nn}$ arranged on a measurement path having both ends on the forerunning point $Hb_n$ related to the measurement point $P_n$ and the aft-running point $Hf_{n-1}$ related to a measurement point $P_{n-1}$ located one point anterior and containing arcs smoothly coupled to these points (step S5). The way points $T_{n1}$-$T_{nn}$ on the measurement path can be determined from a directional variation angle $\theta$ and a way point interval L. In this measurement example, way points are calculated to form two arcs. At the measurement starting point from which the measurement starts, the process in the step S5 is not executed and the flow jumps to the step S6.

The directional variation angle $\theta$ is an angular difference between segments that connect a certain position O to way points. The way point interval L is a distance between adjacent way points. The directional variation angle $\theta$ and the way point interval L may be determined arbitrarily on algorithm. A practical measurement, though, requires a threshold to be set in accordance with, for example, the moving speed of the imaging device. For example, the directional variation angle may be set to have a threshold $\theta_c$ of 10° or less, and the way point interval a threshold $L_c$ of 0.2 mm or more. The threshold $L_c$ of the way point interval may be regarded almost as a function of the moving speed of the measuring machine. The threshold $\theta_c$ of the directional variation angle may be regarded as a function of the controllable maximum acceleration performance of the measuring machine. In a word, ($L_c$, $\theta_c$) may be regarded as a function of the moving speed and can be set per measuring machine type.

The way point calculator 364 determines whether or not a measurement point $P_{n+2}$ located two points posterior to the measurement point $P_n$ exists (step S6). If the measurement point $P_{n+2}$ exists (step S6, YES), the subject is transferred from the measurement point $P_n$ to a measurement point $P_{n+1}$ located one point posterior (step S7) and the processes from the step S3-S6 are repeatedly executed.

If no measurement point $P_{n+2}$ exists (step S6, No), a final process is executed (step S8) and the control terminates the flow. The final process is a process in which the measurement path setter 365 sets a measurement path along the synthesized directions $RV_1$-$RV_m$ and through the measurement points $P_1$-$P_m$ and the way points $T_{11}$-$T_m$.

Thus, in this embodiment, the imaging device moves along a straight line within a certain distance before and after a measurement point and, after passing the certain distance from the measurement point, moves describing an almost arc to smoothly vary the movement direction. Therefore, the imaging device moves linearly before and after a measurement point and accordingly receives no vibration-causing extra load imposed thereon, resulting in a high-precision measurement. After passing the certain distance from the measurement point, the imaging device moves toward the next measurement point describing an almost arc to smoothly vary the movement direction. Accordingly, no load is imposed on the imaging device due to a sharp angular displacement and the moving speed can be maintained constant. Thus, it is possible to execute a measurement much faster.

[Example of Setting Measurement Path with Arrangement Pattern of Other Measurement Points]

Figure 10:
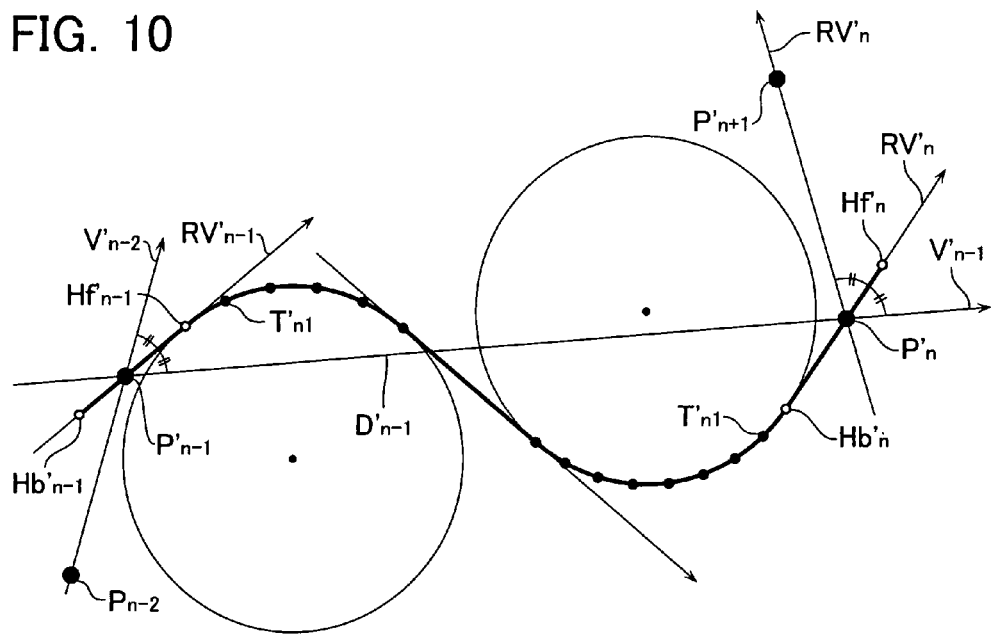
FIG. 10 shows an example of setting measurement paths in the system.
Figure 11:
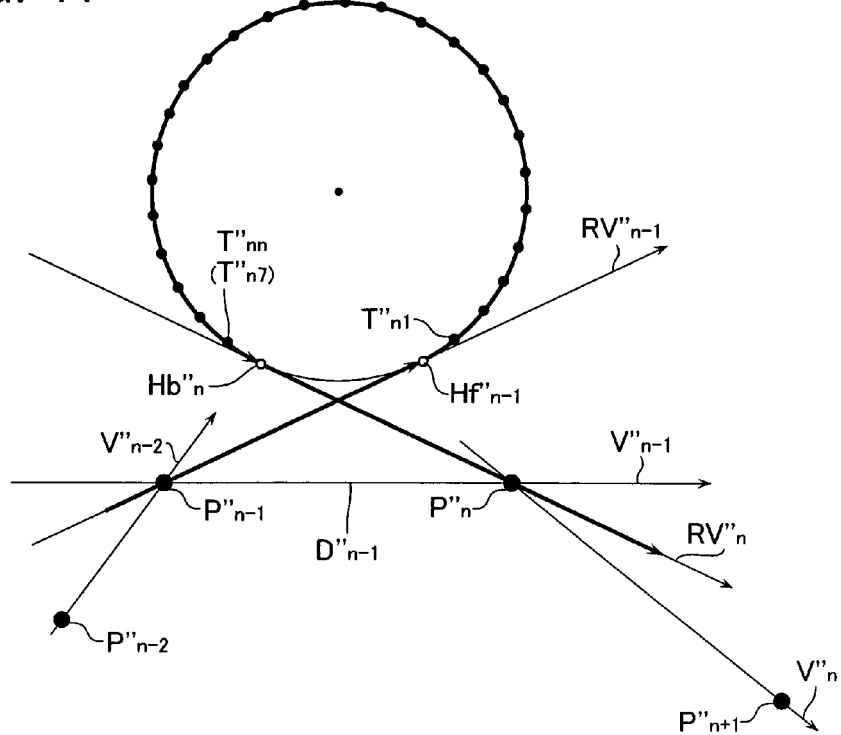
FIG. 11 shows an example of setting measurement paths in the system.
Figure 12:
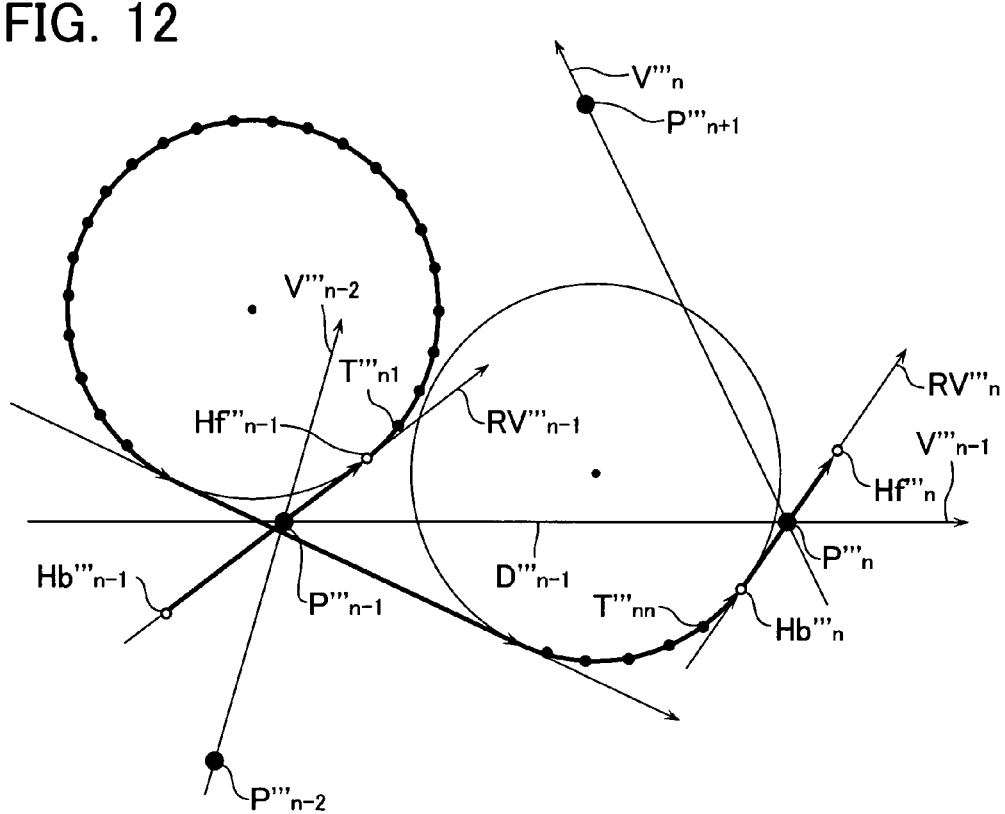
FIG. 12 shows an example of setting measurement paths in the system.
Figure 13:
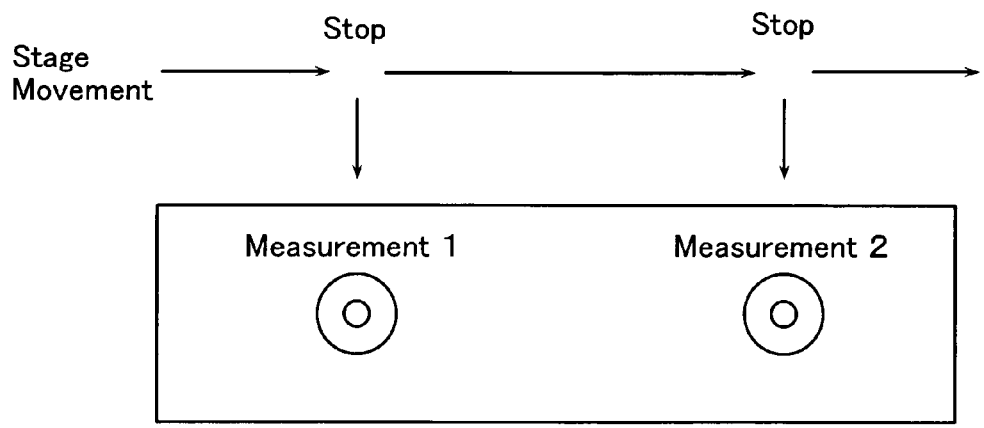
FIG. 13 illustrates a measurement in a standard stop mode.
Figure 14:
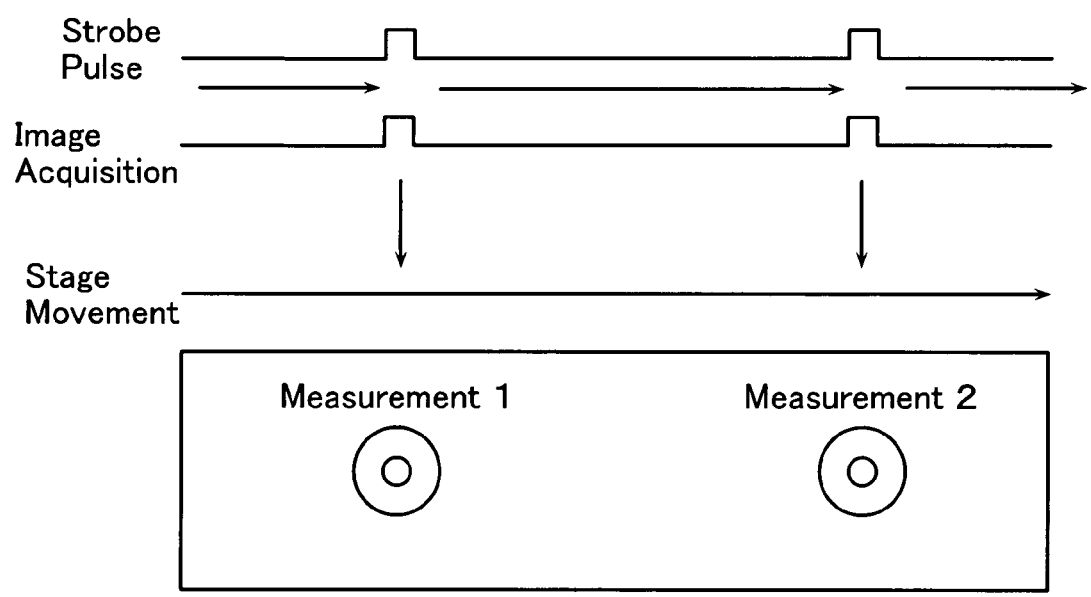
FIG. 14 illustrates a measurement in a nonstop measurement mode.

Referring now to FIGS. 10-12, an example of setting a measurement path is described, which is different from the example of arranging measurement points shown in FIGS. 6-9. FIGS. 10-12 shows an example of setting measurement paths. As described above, way points along arcs on these measurement paths are calculated at the way point calculator 364. They may be determined on the basis of the moving speed of the imaging device, the distance between measurement points, and the angular difference between movement directions at two measurement points for use in calculation of way points.

In the example shown in FIG. 10, the variation direction from $RV'_{n-1}$ to $V'_{n-1}$ is opposite to the variation direction from $V'_{n-1}$ to $RV'_n$, and a common tangent line sandwiched between two arcs exists. In such the case, the way point calculator 364 may arrange way points $T'_{n1}$-$T'_{nn}$ along two arcs and forms a path that connects between the two arcs along a straight line.

In the example shown in FIG. 11, the synthesized direction $RV''_{n-1}$, the movement direction $V''_{n-1}$, and the synthesized direction $RV''_n$ in this order have same variation directions, and a common tangent line between two arcs can not become a path. Different from the example shown in FIG. 9, the measurement point $P''_n$ and the measurement point $P''_{n-1}$ have a distance $D''_{n-1}$ therebetween, and the distance $D''_{n-1}$ is shorter than the distance $D_{n-1}$. In such the case, it is impossible for two arcs and a straight line that connects between the arcs to configure a path as shown in FIG. 9. Therefore, the way point calculator 364 arranges way points $T''_{n1}$-$T''_{nn}$ along one arc that commonly contacts straight lines $RV''_{n-1}$ and $RV''_n$.

The example shown in FIG. 12 is different from the example shown in FIG. 10 in distance $D'''_{n-1}$ between a measurement point $P'''_n$ and a measurement point $P'''_{n-1}$ and the distance $D'''_{n-1}$ is shorter than the distance $D'_{n-1}$. In such the case, the way point calculator 364 calculates a common tangent line against two circles: a circle that is the circle generated through the above-described method and shifted to a line-symmetrical position about $RV'''_{n-1}$; and a circle on the $P'''_n$ side. It then arranges way points $T'''_{n1}$-$T'''_{nn}$ along arcs located on a path including these circles and the common tangent line.

Thus, in accordance with arrangement patterns of measurement points (such as distances between measurement points and movement directions), the way point calculator 364 optimizes the arrangement of the arcs and straight line along which way points are arranged. Accordingly, any measurement path (arrangement of way points) imposes no load on the imaging device due to a sharp angular displacement. In addition, the moving speed can be maintained constant. Therefore, it is possible to execute a measurement much faster.

What is claimed is:

1. An image measuring system for moving an imaging means relative to a measurement stage that supports an object to be measured and taking in instantaneous image information about the object without making a stop of the imaging means at any of a plurality of measurement locations, thereby performing image measuring, the system comprising:

a measurement point acquirer operative to acquire measurement points;

a movement direction calculator operative to acquire a shortest path connecting between the measurement points and to calculate a movement direction on the shortest path, executed by a computer;

a synthesized direction calculator operative to calculate a synthesized direction resulted from synthesis of a movement direction to a certain measurement point from an anterior measurement point of the certain measurement point and a movement direction from the certain measurement point to a posterior measurement point of the certain measurement point, executed by a computer;

a fore/aft-running point calculator operative to calculate a forerunning point at a position spaced a certain distance backward in the synthesized direction from the certain measurement point and to calculate an aft-running point at a position spaced a certain distance forward in the synthesized direction from the certain measurement point, executed by a computer;

a way point calculator operative to calculate a plurality of way points arranged on a path connecting the aft-running point related to the certain measurement point to the forerunning point related to the posterior measurement point of the certain measurement point, such that the path forms a curve which follows the synthesized direction at the aft-running point and the forerunning point, executed by a computer; and a measurement path setter operative to set a measurement path following the synthesized directions and passing through the calculated way points and all measurement points, executed by a computer.

2. The image measuring system according to claim 1, wherein the distance between adjacent way points and the angular difference between adjacent way points about a cardinal point at a certain position are determined in relation to the distance between adjacent measurement points and the moving speed of the imaging means.

3. The image measuring system according to claim 1, wherein the measurement point and the forerunning point have a distance longer than the distance between the measurement point and the aft-running point.

4. The image measuring system according to claim 1, wherein the path containing the way points is a shaped arc.

5. An image measuring method for moving an imaging means relative to a measurement stage that supports an object to be measured and taking in instantaneous image information about the object without making a stop of the imaging means at any of a plurality of measurement locations, thereby performing image measuring, the method comprising:
    a measurement point acquisition step of acquiring measurement points from the image information taken by the imaging means;
    a movement direction calculation step of acquiring a shortest path connecting between the measurement points and calculating a movement direction on the shortest path, executed by a computer;
    a synthesized direction calculation step of calculating a synthesized direction resulted from synthesis of a movement direction to a certain measurement point from an anterior measurement point of the certain measurement point and a movement direction from the certain measurement point to a posterior measurement point of the certain measurement point, executed by the computer;
    a fore/aft-running point calculation step of calculating a forerunning point at a position spaced a certain distance backward in the synthesized direction from the certain measurement point and calculating an aft-running point at a position spaced a certain distance forward in the synthesized direction from the certain measurement point, executed by the computer;
    a way point calculation step of calculating a plurality of way points arranged on a path connecting the aft-running point related to a certain measurement point to the forerunning point related to the posterior measurement point of the certain measurement point, such that the path forms a curve which follows the synthesized direction at the aft-running point and the fore-running point, executed by the computer; and
    a measurement path setting step of setting a measurement path following the synthesized directions and passing through the calculated way points and all measurement points, executed by the computer.

6. The image measuring method according to claim 5, wherein the distance between adjacent way points and the angular difference between adjacent way points about a cardinal point at a certain position are determined in relation to the distance between adjacent measurement points and the moving speed of the imaging means.

7. The image measuring method according to claim 5, wherein the measurement point and the forerunning point have a distance longer than the distance between the measurement point and the aft-running point.

8. The image measuring method according to claim 5, wherein the path containing the way points is a shaped arc.

9. A non-transitory computer readable medium storing a computer executable image measuring program for moving an imaging means relative to a measurement stage that supports an object to be measured and taking in instantaneous image information about the object without making a stop of the imaging means at any of a plurality of measurement locations, thereby performing image measuring, the program comprising:
    a measurement point acquisition step of acquiring measurement points from the image information taken by the imaging means;
    a movement direction calculation step of acquiring a shortest path connecting between the measurement points and calculating a movement direction on the shortest path, executed by a computer;
    a synthesized direction calculation step of calculating a synthesized direction resulted from synthesis of a movement direction to a certain measurement point from an anterior measurement point of the certain measurement point and a movement direction from the certain measurement point to a posterior measurement point of the certain measurement point, executed by the computer;
    a fore/aft-running point calculation step of calculating a forerunning point at a position spaced a certain distance backward in the synthesized direction from the certain measurement point and calculating an aft-running point at a position spaced a certain distance forward in the synthesized direction from the certain measurement point, executed by the computer;
    a way point calculation step of calculating a plurality of way points arranged on a path connecting the aft-running point related to the certain measurement point to the forerunning point related to the posterior measurement point of the certain measurement point, such that the path forms a curve which follows the synthesized direction at the aft-running point and the forerunning point, executed by the computer; and
    a measurement path setting step of setting a measurement path following the synthesized directions and passing through the calculated way points and all measurement points, executed by the computer.

10. The non-transitory computer readable medium storing image measuring program according to claim 9, wherein the distance between adjacent way points and the angular difference between adjacent way points about a cardinal point at a certain position are determined in relation to the distance between adjacent measurement points and the moving speed of the imaging means.

11. The non-transitory computer readable medium storing image measuring program according to claim 9, wherein the measurement point and the forerunning point have a distance longer than the distance between the measurement point and the aft-running point.

12. The non-transitory computer readable medium storing image measuring program according to claim 9, wherein the path containing the way points is a shaped arc.

* * * * *